United States Patent Office 3,277,118
Patented Oct. 4, 1966

3,277,118
QUATERNARY AMMONIUM FLUORIDES
Hans Schmid, Muttenz, and Hans Rudolf Mühlemann, Zurich, Switzerland, assignors to GABA AG, Basel, Switzerland, a Swiss company
No Drawing. Filed Mar. 7, 1963, Ser. No. 263,439
Claims priority, application Switzerland, May 29, 1958, 59,996
The portion of the term of the patent subsequent to Mar. 10, 1981, has been disclaimed
16 Claims. (Cl. 260—347.7)

This is a continuation-in-part of application Serial No. 815,253, filed May 25, 1959, now U.S. Patent 3,124,512.

The present invention relates to quaternary ammonium fluorides useful in caries prophylaxis. In recent years research has shown that the element, fluorine, is of considerable importance in the formation of dentin and that a deficiency in this element leads to an increased tendency of the teeth to dissolve in acids, thus reducing the resistance of teeth to caries. Moreover, it is known that the acids responsible for a slow dissolution of dentin are formed by bacterial and enzymatic decomposition of food particles.

By providing a sufficiency of the element, fluorine, the solubility of dental enamel in acids can be significantly reduced, the introduction of fluorine being possible prior to dentition through the medium of the blood and after dentition by external applications. For the latter purpose, fluorine has generally been used in the form of an inorganic, e.g. in the form of an alkali metal fluoride, tin fluoride, silicofluoride and as a complex fluoride of an element of Group IV of the Periodic System (British specification No. 644,339).

It has now been found that certain water-soluble quaternary ammonium fluorides reduce the solubility of dental enamel in acids to a significant degree. The presence of one or several long-chain radicals in such compounds, moreover, imparts foaming, wetting and, in particular, bactericidal properties to the fluoride. Thus when applied externally in the cavity of the mouth, they are capable of inhibiting the cleavage of carbohydrate-containing remainders of foodstuffs into acidic, enamel-dissolving decomposition products. These long-chain cation-active ammonium fluorides are thus active agents for caries prophylaxis both due to their ability to increase the resistance of dental enamel to the action of acids (fluorine action) and due to their bactericidal activity.

It is an object of this invention to provide compounds for caries prophylaxis, said compounds being water-soluble long-chain quaternary ammonium fluorides which are anti-caries agents. This and other advantages are apparent from application Serial No. 815,253, filed May 25, 1959 (now U.S. Patent No. 3,124,512), of which this application is a continuation-in-part, and from the following detailed description.

The long chain quaternary ammonium fluorides according to this invention are represented by the following formulae:

(I)
$$\left[ \begin{array}{c} R_1 \\ \diagdown \\ R_2 \end{array} \!\!\!\stackrel{+}{N}\!\!\! \begin{array}{c} R_3 \\ \diagup \\ R_4 \end{array} \right] F^-$$

(II)
$$\left[ \begin{array}{c} \phantom{x} \\ \stackrel{+}{N} \\ | \\ R \end{array} \right] F^-$$

(III)
$$\left[ \begin{array}{c} X \\ H_2C \diagup \diagdown CH_2 \\ | \phantom{xx} | \\ H_2C \diagdown \diagup CH_2 \\ \stackrel{+}{N} \\ R_5 \phantom{x} R \end{array} \right] F^-$$

(IV)
$$\left[ \begin{array}{c} R \\ \diagdown \\ R_3 \!\!-\!\!\stackrel{+}{N}\!\!-\!\!CH_2CH_2\!\!-\!\!\stackrel{+}{N}\!\!-\!\!R_3 \\ \diagup \phantom{xxxxxxxxxxx} \diagdown \\ R_4 \phantom{xxxxxxxxxxxxxx} R_4 \end{array} \right] 2F^-$$

(V)
$$\left[ \begin{array}{c} R \phantom{xxxxxxxx} R_7 \\ \diagdown \phantom{xxxxxxx} \diagup \\ R_3\!\!-\!\!\stackrel{+}{N}\!\!-\!\!R_6\!\!-\!\!CON \\ \diagup \phantom{xxxxxxx} \diagdown \\ R_4 \phantom{xxxxxxxx} R_8 \end{array} \right] F^-$$

wherein

R is alkyl having from 8 to 20, and preferably from 12 to 18, carbon atoms, e.g. octyl, dodecyl and octadecyl;

$R_1$ may have the same meaning as R; alkenyl having from 8 to 20, and preferably from 12 to 18, carbon atoms and one or more carbon-to-carbon double bonds (either conjugated or non-conjugated), e.g. octenyl, hexedecenyl and eicosenyl; or alkylol having from 8 to 20, and preferably from 12 to 18, carbon atoms, e.g. hydroxyoctyl, hydroxytetradecyl and hydroxyeicosyl;

$R_2$ is alkyl having at most 20 carbon atoms, either straight chain or branched chain, e.g. methyl, isooctyl, dodecyl and eicosyl; lower alkylol, e.g. hydroxymethyl, γ-hydroxybutyl and hydroxyoctyl; lower alkoxy, e.g. methoxy, pentoxy and octyloxy; (lower alkoxy)-(lower alkyl), e.g. methoxy methyl, methoxy octyl, octyloxy methyl and octyloxy octyl; phenoxy-(lower alkyl), e.g. phenoxymethyl, phenoxybutyl and phenoxyoctyl; carboxymethyl; lower cycloalkyl, e.g. cyclobutyl, cyclohexyl and cyclooctyl; furfuryl; and carbocyclic aryl, e.g. diphenyl, phenyl and naphthyl;

$R_3$ is lower alkyl, e.g. methyl, ethyl, propyl, butyl, pentyl, hexyl, heptyl and octyl;

$R_4$ is lower alkyl as exemplified for $R_3$;

$R_5$ is alkyl having at most 20 carbon atoms, e.g. methyl, heptyl, dodecyl, hexadecyl and eicosyl;

$R_6$ is lower alkylene, e.g. methylene, propylene, octylene;

$R_7$ is lower alkyl as exemplified for $R_3$;

$R_8$ is hydrogen or lower alkyl as exemplified for $R_3$; and

X is either sulfur or oxygen.

In each of the preceding definitions and throughout this disclosure "lower" is employed to define groups having at most eight carbon atoms. In contrast, "higher" or "long chain" is used to designate chains (primarily carbon-to-carbon chains) of from eight to twenty carbon atoms.

Each of the compounds represented by Formulae I to V is a water-soluble quaternary ammonium fluoride. For use in caries prophylaxis compositions each of said compounds is best employed in a composition with a fluoride-compatible carrier. The concentration of the quaternary ammonium fluoride in the composition is sufficient to provide from about 0.01% to about 2.0% by weight (based upon the weight of the total composition) of ionizable fluorine.

Quaternary ammonium fluorides according to this invention are hygroscopic crystalline solids or liquids soluble in methanol and ethanol. The long chain substituents are responsible for the formation of foaming aqueous solutions. Said fluorides are incompatible with anion-active compounds, such as alkyl sulfates, alkaryl sulfates and soaps.

Quaternary ammonium fluorides are prepared by quaternizing the corresponding substituted secondary or tertiary amines with an organic fluoride. The secondary and tertiary amines used as starting materials are obtained by conventional methods. Quaternization is carried out, e.g., by heating with the addition of a solvent or diluent.

The more readily accessible corresponding quaternary ammonium chlorides or bromides can also be used for preparing the quaternary ammonium fluorides. The chloride or bromide is reacted in the presence of a solvent with a simple metal fluoride in such a manner that the metal chloride or bromide formed in the reaction precipitates from the solvent. For this purpose metal fluorides are used which are more soluble in the selected solvent than the corresponding chloride or bromide. The quaternary ammonium fluoride formed during the reaction remains in solution from which it can be recovered by conventional methods after removal of the insoluble salt. Potassium fluoride or silver fluoride is preferably employed. The reaction with potassium fluoride is, e.g., carried out in ethanol, aqueous ethanol, an ethanol-acetone mixture or a water-acetone mixture. The reaction with silver fluoride proceeds in an aqueous medium.

The quaternary ammonium fluorides are mixed with conventional solid or liquid diluents and other additives, such as abrasive agents, fillers, binders, solvents and flavoring agents, in order to prepare compositions having a high caries prophylactic activity. These compositions are prepared in the form of tooth paste or powder, mouth wash, lozenges or tablets and dental preparations for use in dentistry.

A group of compounds of the present invention are those of Formula I.

wherein $R_1$ represents a high molecular hydrocarbon radical having a chain length of from $C_8$ to $C_{20}$, either saturated, e.g. octyl and eicosyl, or ethylenically unsaturated, e.g. decenyl and nonadecenyl. The radical is preferably from $C_{12}$ to $C_{18}$, e.g. dodecyl, hexadecenyl and octadecyl. $R_1$, as defined above, may also be substituted, e.g. eicosoate, mercaptohexadecyl and aminododecyl, or interrupted, e.g. butoxyhexadecyl, hexylthiodecyl and pentylaminopropyl, by a hetero atom, e.g. oxygen, sulfur and nitrogen, or groups such as —CO—, e.g. octylketobutyl.

$R_2$ has the same meaning as $R_1$ or represents lower alkyl, e.g. methyl, ethyl, propyl, butyl, isopentyl, hexyl, heptyl and octyl; lower alkenyl, e.g. vinyl, allyl, butenyl, octenyl; lower alkylol, e.g. β-hydroxyethyl, γ-hydroxypentyl and ω-hydroxyoctyl; lower alkoxy, e.g. methoxy and octyloxy; (lower alkoxy)-(lower alkyl), e.g. methoxyethyl, ethoxyhexyl, heptoxybutyl and pentoxypropyl; phenoxy-(lower alkyl), e.g. phenoxymethyl and phenoxyoctyl; furfuryl; carboxymethyl; carbocyclic (at most bicyclic) aryl, e.g. phenyl, diphenyl and naphthyl; or lower cycloalkyl, e.g. cyclopropyl, cyclopentyl, cyclohexyl and cyclooctyl; or lower cycloalkyloxy lower alkyl, e.g. carbocyclohexoxyethyl.

$R_3$ represents lower alkyl, e.g. methyl, propyl, amyl and octyl; lower alkenyl, e.g. ethenyl, pentenyl and octenyl; lower alkylol, e.g. methylol and hydroxyoctyl; or lower alkoxy, e.g. methoxy and octyloxy.

$R_4$ represents one of the radicals of $R_3$, naphthyl or phenoxyethyl.

Examples of quaternary ammonium fluorides according to this invention are:

octyl-trimethyl-ammonium fluoride,
dodecyl-ethyl-dimethyl-ammonium fluoride,
octadecyl-methyl-diethanol-ammonium fluoride,
dilauryl-dimethyl-ammonium fluoride,
$\Delta^{8,9}$-octadecenyl-naphthyl-dimethyl-ammonium fluoride,
dioctyl-diethyl-ammonium fluoride,
cyclohexyl-cetyl-dimethyl-ammonium fluoride,
furfuryl-lauryl-dimethyl-ammonium fluoride,
phenoxyethyl-cetyl-dimethyl-ammonium fluoride,
N-(2-ethoxy-ethyl)-N-dodecyl-dimethyl-ammonium fluoride,
N-(β-hydroxydodecyl)-trimethyl-ammonium fluoride,
N-phenyl-N-hexadecyl-diethyl-ammonium fluoride,
N-cyclohexyl-N-octadecyl-dimethyl-ammonium fluoride,
N-(2-carbocyclohexoxyethyl)-N-myristyl-dimethyl-ammonium fluoride,
N-(2-carbophenoxyethyl)-N-dodecyl-dimethyl-ammonium fluoride, and
N-carboxymethyl-N-eicosyl-dimethyl-ammonium fluoride.

Additional examples of quaternary ammonium fluorides according to this invention are those of Formula I wherein $R_1$, $R_2$, $R_3$ and $R_4$ are as enumerated in Table 1.

TABLE 1

| Compound | R¹ | R² | R³ | R⁴ |
| --- | --- | --- | --- | --- |
| 1 | H(CH₂)₈— | H₃C— | H₂C=CH—CH=CH— | 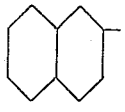 |
| 2 | H(CH₂)₁₂— | H(CH₂)₈— | H(CH₂)₈—O— | (CH₃)₂CH— |
| 3 | H(CH₂)₁₈— | (CH₃)₂CH— | H₂C=CH—(CH₂)₆— | H₃C— |
| 4 | H(CH₂)₂₀— | H₂C=CH— | HO—(CH₂)₄— | H₂C=CH—CH=CH— |
| 5 | 3,7-dimethyl-2,6-octadienyl | H₂C=CH—(CH₂)₆— | H(CH₂)₈— | H(CH₂)₈—O— |
| 6 | 1-dodecenyl | H₃C—CHOH— | H₃C—O— | 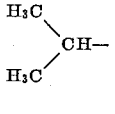 |
| 7 | 9,12,15-octadecatrienyl | HO—(CH₂)₈— | H(CH₂)₈— | H₂C=CH—(CH₂)₆— |
| 8 | Arachidonyl | H₃C—O—CH₂— | HO—CH₂— | HO—(CH₂)₈— |
| 9 | H₂N—(CH₂)₁₀— | H₃C—O—(CH₂)₈— | H₂C=CH—(CH₂)₈— | H(CH₂)₈— |
| 10 | HS—(CH₂)₁₆— | H(CH₂)₈—O—CH₂— | H(CH₂)₈— | H₃C—O— |
| 11 | HOOC—(CH₂)₁₉— | H(CH₂)₈—O—(CH₂)₈— | H₃C—CHOH—CH₂— | H(CH₂)₈— |

TABLE 1—Continued

| Compound | R¹ | R² | R³ | R⁴ |
|---|---|---|---|---|
| 12 | $H(CH_2)_4-O-(CH_2)_{16}-$ | phenyl | $H_2C=CH-$ | $HO-CH_2-$ |
| 13 | $H(CH_2)_6-S-(CH_2)_{10}-$ | biphenyl | $H(CH_2)_4-O-$ | $H_2C=CH-(CH_2)_3-$ |
| 14 | $H(CH_2)_5-NH-(CH_2)_3-$ | naphthyl | $\begin{array}{c}H_3C\\ \phantom{H_3}CH-\\ H_3C\end{array}$ | $H_3C-CHOH-CH_2-$ |
| 15 | $H(CH_2)_8-CO-(CH_2)_4-$ | Cyclohexyl | $H_3C$ | $H_2C=CH-$ |
| 16 | $H(CH_2)_8-$ | $H_3C-O-$ | $H_2C=CH-(CH_2)_6-$ | phenyl-$O-(CH_2)_2-$ |
| 17 | $H(CH_2)_{12}-$ | phenyl-$O-CH_2-$ | $H_2C=CH-$ | $H_3C-$ |
| 18 | $HS-(CH_2)_{12}-$ | $H(CH_2)_8-O-$ | $H(CH_2)_8-$ | $HO-(CH_2)_8-$ |
| 19 | $H(CH_2)_{18}-$ | Furfuryl | $HO-(CH_2)_8-$ | $H(CH_2)_4-O-$ |
| 20 | Oleyl | phenyl-$O-(CH_2)_8-$ | $H_3C-O-$ | $H(CH_2)_3$ |
| 21 | $H(CH_2)_{20}-$ | $H_3C-CO-$ | $HO-CH_2-$ | naphthyl |

The quaternary ammonium fluorides of Formula I are prepared in the same manner as set forth in Examples 1 and 2.

Example 1

To 101 parts by weight of triethylamine are added, while stirring, 188 parts by weight of dodecyl fluoride, and the mixture is maintained at 50° C. for 6 hours. On cooling of the reaction mixture to 20° C., the produced dodecyl-triethyl-ammonium fluoride is obtained in the form of a hygroscopic crystalline mass. This compound is soluble in water, ethanol and methanol.

Example 2

30.4 parts by weight of lauryl-phenyl-methyl-ethyl-ammonium bromide are dissolved in 200 parts by weight of water, and to the solution is added an aqueous solution of 12.7 parts by weight of silver fluoride. The precipitated silver bromide is filtered off, and the filtrate is concentrated in vacuo whereby lauryl-phenyl-methyl-ethyl-ammonium fluoride remains as a syrupy liquid which begins to crystallize after standing for a prolonged period.

The long-chain quaternary ammonium fluorides are used in caries-prophylaxis compositions in concentrations sufficient to provide from about 100 to about 7500 parts of fluoride per million parts of the compositions. If the composition is of the type ordinarily applied by a dentist, such as an aqueous topical solution or prophylaxis paste, concentrations sufficient to provide from about 100 p.p.m. to about 7500 p.p.m. of fluoride are used. In toothpaste, toothpowder, mouthwash and the like, the concentration should be sufficient to provide from about 100 p.p.m. to about 4000 p.p.m. of fluoride ion. Preferably, products intended for frequent use in the home contain a quantity of the long-chain quaternary ammonium fluorides sufficient to provide from about 500 p.p.m. to 3000 p.p.m. of fluoride ion.

The pH of the compositions are preferably within the range from about 3.5 to 7.0 while in contact with the teeth. Above about pH 7.0 the effects of fluoride ion in reducing enamel solubility diminishes. Below about pH 3.5 undesirable alteration of the tooth structure can occur. Preferably the pH of these compositions is in the range from about 3.8 to about 5.5 while in contact with the teeth.

Acidifying agents which are suitable for use in the oral cavity can be used to adjust and maintain the pH of the composition within the desired range. Suitable acidifying agents include, for example, acetic acid, citric acid, sodium or potassium dihydrogen phosphate, and hydrochloric acid.

In addition to the quaternary ammonium fluorides the compositions of the present invention may contain conventional additives which are not anion-active. In view of the fact that the fluorine is partially deactivated by the more commonly used abrasives, such as calcium carbonate, magnesium carbonate, dicalcium orthophosphate, calcium sulfate, kaolin, etc., it is preferable to use fluoride compatible abrasives, such as the oxides, ortho- or pyrophosphates of tin or zinc, in the compositions. Moreover, the dental compositions may also contain surface-active substances of non-ionic or cation-active nature as forming and cleansing agents as well as flavoring agents. In paste-like dental compositions mucilages of non-ionic nature are conveniently used.

Some examples of caries prophylaxis compositions are given hereinafter by way of non-limiting illustration.

*Example 3.—Tooth Paste*

| Ingredients: | Percent by weight |
|---|---|
| Zinc phosphate | 20.0 |
| Titanium dioxide | 2.0 |
| Glycerol | 12.0 |
| Methyl cellulose | 3.0 |
| Flavoring agent | 1.0 |
| Dodecyl-trimethyl-ammonium fluoride (1000 p.p.m. F⁻) | 1.3 |
| Water | 60.7 | pH 5.0 (adjusted with HCl).

The methyl cellulose is dissolved in part of the water to form a mucilage whereupon the quaternary ammonium fluoride, dissolved in the remaining amount of water, is added. Then glycerol, the flavoring agent and finally the powdered ingredients are incorporated. The mass is thoroughly mixed in a suitable mixer and, if necessary, homogenized in a roller or colloid mill.

This composition is effective for use in caries prophylaxis and has acceptable consumer properties. It is stable and remains active for long periods of time under normal conditions of storage. The dodecyl-trimethyl-ammonium fluoride employed in this example may be replaced by octadecyl-methyl-diethanol-ammonium fluoride, phenoxyethyl-cetyl-dimethyl-ammonium fluoride, $\Delta^{8,9}$-octadecenyl-triethyl-ammonium fluoride, dioctyl-dimethyl-ammonium fluoride and N - ($\beta$ - hydroxy - dodecyl) - trimethyl-ammonium fluoride, for example, in quantities sufficient to provide the same level of fluoride ion with no substantial loss of the beneficial properties of the composition.

Effective jelly-like dentifrice compositions can be prepared by omitting the abrasive ingredient and incorporating a small proportion of titanium dioxide, for example, as a pigmenting agent. This is illustrated in the following example.

*Example 4*

| Ingredients: | Percent by weight |
|---|---|
| Titanium dioxide | 2.0 |
| Mucilage jelly from powdered fruit-kernels | 79.57 |
| Glycerol | 16.0 |
| Saccharin | 0.1 |
| Flavoring agent | 1.0 |
| Lauryl - phenyl - trimethyl - ammonium fluoride (750 p.p.m. F⁻) | 1.33 | pH 5.5 (adjusted with acetic acid).

N - cyclohexyl - cetyl - dimethyl - ammonium fluoride, furfuryl-lauryl-dimethyl-ammonium fluoride, N-phenyl-N-hexadecyl-diethyl-ammonium fluoride, N-cyclohexyl-N-octadecyl - dimethyl - ammonium fluoride, or N - (2-carbocyclohexoxy - ethyl) - N - myristyl - dimethyl - ammonium fluoride may be used in place of lauryl-phenyl-trimethyl-ammonium fluoride in the above composition without loss of the desired anticaries properties, as long as the total fluoride content is at least as great.

*Example 5*

A mouth wash having the following composition is prepared:

| Ingredients: | Percent by weight |
|---|---|
| Ethyl alcohol | 71.75 |
| Glycerol | 12.0 |
| Flavoring agent | 6.0 |
| Dodecyl - ethyl - dimethyl - ammonium fluoride (7500 p.p.m. F⁻) | 10.25 |

Prior to use, this composition is diluted, e.g. by adding 2 ml. of the concentrate to 50 ml. of water, to obtain a fluorine concentration of 300 p.p.m.

The quaternary ammonium fluoride is dissolved in ethyl alcohol. Glycerol and the flavoring ingredients are added to this solution. When used with sufficient frequency this mouthwash provides an excellent caries prophylactic.

N - carboxymethyl - N - eicosyl - dimethyl - ammonium fluoride, N - ($\beta$ - hydroxy - dodecyl) - triethanol-ammonium fluoride, octyl-trimethyl-ammonium fluoride, and stearyl-phenyl-dimethyl-ammonium fluoride can be used in conjunction with or in place of the dodecyl-ethyl-dimethyl-ammonium fluoride employed in this example without loss of the desired properties.

*Example 6*

A toothpowder may be prepared as follows—

| Ingredients: | Percent by weight |
|---|---|
| Zinc pyrophosphate | 96.32 |
| Flavoring agent | 1.0 |
| Phenoxyethyl - cetyl - dimethyl - ammonium fluoride (1000 p.p.m. F⁻) | 2.18 |
| Citric acid | 0.5 |

Zinc pyrophosphate and citric acid are well mixed with the quaternary ammonium fluoride in a suitable mixer. The mixture is, if necessary, finely ground, and finally the flavoring ingredient is stirred in. This composition is stable and is effective in inhibiting caries formation.

Although the foregong exemplification of dental compositions for caries prophylaxis is directed to products which are ordinarily used in the home, it is to be understood that compositions that are usually applied by the dentist are also contemplated. For example, a dental prophylaxis paste containing the usual pumice and flavoring components is formulated to contain, in addition to the usual materials, 7.2% by weight of the total composition of lauryl-triethanol - ammonium fluoride (4000 p.p.m. F⁻), for example, while adjusting the pH of the composition to 5.0 with citric acid. Such a composition employed in the usual manner by the dentist is of exceptional value in caries prophylaxis.

Aqueous solutions of the water-soluble long-chain quaternary ammonium fluorides of this invention, adjusted to a pH within the range of 3.5 to 7.0 with any of the hereinbefore acidifying agents, may be topically applied to the teeth by the dentist. Such compositions may also contain, e.g., flavoring materials.

A second group of compounds (according to the present invention), which reduce the solubility of dental enamel in acids, includes heterocyclic ammonium compounds containing at least one quaternary nitrogen atom with anionically bound fluorine. Among these compounds are pyridinium compounds of Formula II wherein R represents alkyl from 8 to 20 carbon atoms and preferably from 12 to 18 carbon atoms, e.g. octyl, dodecyl, octadecyl and eicosyl; alkenyl from 8 to 20 carbon atoms and preferably from 12 to 18 carbon atoms, e.g. octenyl, hexadecenyl and eicosenyl; alkylol having from 8 to 20, and preferably from 12 to 18, carbon atoms, e.g. hydroxyoctyl, hydroxytetradecyl and hydroxyeicosyl; alkoxyalkyl having a total of at most twenty carbon atoms, including (lower alkoxy)-(lower alkyl), e.g. methoxymethyl, ethoxyoctyl, propoxyheptadecyl, hexadecyloxybutyl, dodecyloxyamyl, decyloxynonyl, and octyloxymethyl; carbocyclic ar(lower)alkyl, e.g. 4-phenylbenzyl, phenylethyl and $\alpha$ - naphthyl-3-propyl; lower cycloalkyl, e.g. cyclopropyl, cyclohexyl and cyclooctyl; or heterocyclic, e.g. furfuryl, morpholino, thiomorpholino, picolino, piperidino, pyrrolidino, quinolino and indolino.

The preferred compounds of Formula II are those wherein R is alkyl, especially alkyl with from 12 to 18 carbon atoms.

Examples of quaternary ammonium fluorides of Formula II are:

N-cetyl-pyridinium fluoride,
N-dodecyl-pyridinium fluoride,
N-octadecyl-pyridinium fluoride,
N-octyl-pyridinium fluoride,
N-eicosyl-pyridinium fluoride,
N-3,7-dimethyl-2,6-octadienyl-pyridinium fluoride,
N-1-dodecenyl-pyridinium fluoride,
N-9,12,15-octadecatrienyl-pyridinium fluoride,
N-arachidonyl-pyridinium fluoride,
N-α-hydroxyoctyl-pyridinium fluoride,
N-9-hydroxytetradecyl-pyridinium fluoride,
N-ω-hydroxyeicosyl-pyridinium fluoride,
N-methoxymethyl-pyridinium fluoride,
N-ethoxyoctyl-pyridinium fluoride,
N-propoxyheptadecyl-pyridinium fluoride,
N-cetyloxybutyl-pyridinium fluoride,
N-dodecyloxyamyl-pyridinium fluoride,
N-decyloxynonyl-pyridinium fluoride,
N-octyloxymethyl-pyridinium fluoride,
N-4-phenylbenzyl-pyridinium fluoride,
N-phenylethyl-pyridinium fluoride,
N-α-naphthyl-3-propyl-pyridinium fluoride,
N-cyclopropyl-pyridinium fluoride,
N-cyclohexyl-pyridinium fluoride,
N-cyclooctyl-pyridinium fluoride,
N-furfuryl-pyridinium fluoride,
N-morpholino-pyridinium fluoride,
N-thiomorpholino-pyridinium fluoride,
N-picolino-pyridinium fluoride,
N-piperidino-pyridinium fluoride,
N-pyridino-pyridinium fluoride,
N-pyrrolidino-pyridinium fluoride,
N-quinolino-pyridinium fluoride, and
N-indolino-pyridinium fluoride.

The quaternary ammonium fluorides of Formula II are prepared in the same manner as set forth in Example 7.

Example 7

79 parts by weight of pyridine are dissolved in 750 parts by weight of ethanol. The resulting solution is added, while stirring, to 244 parts by weight of cetyl fluoride at 50° C. The mixture is then refluxed for two hours, and the solvent is thereafter evaporated. The residue consists of cetyl-pyridinium fluoride which is in the form of a crystalline mass which is soluble in water, methanol and ethanol.

Compounds of Formula II are advantageously employed in dental compositions in the same manner and for the same purpose as those of Formula I. An exemplary dental composition is:

Example 8.—Tooth paste

| Ingredient: | Percent by weight |
|---|---|
| Zinc phosphate | 20.0 |
| Titanium dioxide | 2.0 |
| Glycerol | 12.0 |
| Methyl cellulose | 3.0 |
| Flavoring agent | 1.0 |
| N-cetyl-pyridinium fluoride (corresponding to 0.1% F) | 1.7 |
| Water | 60.3 |

The methyl cellulose is dissolved in part of the water to form a mucilage whereupon the quaternary ammonium fluoride, dissolved in the remaining amount of water, is added. Then glycerol, the flavoring agent and finally the powdered ingredients are incorporated. The mass is thoroughly mixed in a suitable mixer and, if necessary, homogenized in a roller or colloid mill.

The pH of tooth paste compositions is between 3.5 and 7.0, preferably between 3.8 and 5.5. The proportion of quaternary ammonium fluoride, calculated as fluorine, is 0.01 to 2.0%, preferably 0.05 to 0.3%, by weight. With these considerations in mind, any non-toxic quaternary ammonium fluoride of Formula II can be employed, either singly or in combination, in tooth paste formulations similar to that of Example 8.

Further heterocyclic quaternary ammonium compounds according to this invention are the morpholinium and thiomorpholinium fluorides of Formula III wherein X is oxygen or sulfur;

R represents alkyl having from 8 to 20, preferably 12 to 18, carbon atoms, e.g. octyl, dodecyl, octadecyl, eicosyl; alkenyl from 8 to 20, preferably from 12 to 18, carbon atoms, e.g. octenyl, hexadecenyl and eicosenyl; alkylol having from 8 to 20, preferably from 12 to 18, carbon atoms, e.g. hydroxyoctyl, hydroxytetradecyl and hydroxyeicosyl; alkoxyalkyl having a total of at most twenty carbon atoms, including (lower alkoxy)-(lower alkyl), e.g. methoxymethyl, ethoxyloctyl, propoxyheptadecyl, cetyloxybutyl, dodecyloxyamyl, decyloxynonyl and octyloxymethyl; carbocyclic ar(lower)alkyl, e.g. 3-phenylbenzyl, phenylpropyl and and β-naphthyl-2-ethyl; or lower cycloalkyl, e.g. cyclopropyl, cyclopentyl, cyclohexyl and cyclooctyl.

$R_5$ represents one of the radicals defined above as R or lower alkyl, e.g. methyl, ethyl, propyl, butyl, amyl, hexyl, heptyl and octyl.

Preferred compounds of Formula III are those wherein both R and $R_5$ are alkyl, particularly alkyl having from 8 to 20, especially from 12 to 18, carbon atoms. Examples of quaternary ammonium fluorides of Formula III are those wherein X, R and $R_5$ are as enumerated in Table 2.

TABLE 2

| Compound | X | R | $R_5$ | X | Compound |
|---|---|---|---|---|---|
| 1 | Oxygen | Octyl | Eicosyl | Sulfur | 35 |
| 2 | do | Dodecyl | Octadecyl | do | 36 |
| 3 | do | Cetyl | Cetyl | do | 37 |
| 4 | do | Octadecyl | Dodecyl | do | 38 |
| 5 | do | Eicosyl | Octyl | do | 39 |
| 6 | do | Nonyl | Heptyl | do | 40 |
| 7 | do | Tetradecyl | Amyl | do | 41 |
| 8 | do | Heptadecyl | Propyl | do | 42 |
| 9 | do | Nonadecyl | Methyl | do | 43 |
| 10 | do | Octyl | Cyclopropyl | do | 44 |
| 11 | do | Dodecyl | β-Naphthyl-2-ethyl | do | 45 |
| 12 | do | Cetyl | Octyloxymethyl | do | 46 |
| 13 | do | Octadecyl | Methoxymethyl | do | 47 |
| 14 | do | Eicosyl | ω-Hydroxyeicosyl | do | 48 |
| 15 | do | 3,7-dimethyl-2,6-octadienyl | Decyloxynonyl | do | 49 |
| 16 | do | 1-dodecenyl | Eicosyl | do | 50 |
| 17 | do | 9,12,15-octadecatrienyl | Cyclohexyl | do | 51 |
| 18 | do | α-Hydroxyoctyl | Phenylpropyl | do | 52 |
| 19 | do | 9-hydroxytetradecyl | Octadecyl | do | 53 |
| 20 | do | ω-Hydroxyeicosyl | Cyclopentyl | do | 54 |
| 21 | do | Methoxymethyl | 3-phenylbenzyl | do | 55 |

TABLE 2—Continued

| Compound | X | R | R₅ | X | Compound |
|---|---|---|---|---|---|
| 22 | ---do--- | Ethoxyoctyl | Dodecyloxyamyl | ---do--- | 56 |
| 23 | ---do--- | Propoxyheptadecyl | 9-hydroxytetradecyl | ---do--- | 57 |
| 24 | ---do--- | Cetyloxybutyl | 1-dodecenyl | ---do--- | 58 |
| 25 | ---do--- | Dodecyloxyamyl | Cetyl | ---do--- | 59 |
| 26 | ---do--- | Decyloxynonyl | Cyclooctyl | ---do--- | 60 |
| 27 | ---do--- | Octyloxymethyl | Cetyloxybutyl | ---do--- | 61 |
| 28 | ---do--- | 3-phenylbenzyl | Propoxyheptadecyl | ---do--- | 62 |
| 29 | ---do--- | Phenylpropyl | 3,7-dimethyl-2,6-octadienyl | ---do--- | 63 |
| 30 | ---do--- | β-Naphthyl-2-ethyl | Dodecyl | ---do--- | 64 |
| 31 | ---do--- | Cyclopropyl | Ethoxyoctyl | ---do--- | 65 |
| 32 | ---do--- | Cyclopentyl | α-Hydroxyoctyl | ---do--- | 66 |
| 33 | ---do--- | Cyclohexyl | 9,12,15-octadecatrienyl | ---do--- | 67 |
| 34 | ---do--- | Cyclooctyl | Octyl | ---do--- | 68 |

In Table 2 the number of the compound is given in the left column when X is oxygen and in the right column when X is sulfur. The quaternary ammonium fluorides of Formula III are prepared in the same manner as is exemplified in Example 9.

*Example 9*

115.2 parts by weight of N-ethylmorpholine and 214.4 parts by weight of myristylfluoride are dissolved in 100 parts by weight of toluene.

The solution is allowed to stand over night, whereupon it is heated for 3 hours at 110° C., is again allowed to stand for 12 hours, whereafter the reaction mass can be worked up as follows, either:

(a) Precipitated crystals of the quaternary ammonium compound are filtered off, then dissolved in ether and the ether solution is extracted with water. The aqueous solution is evaporated to dryness in vacuo and the tetradecyl-ethyl-morpholinium-fluoride obtained as residue or:

(b) The entire reaction mass is dissolved in ether, the ether solution is extracted with water and the aqueous solution is evaporated as under (a).

Compounds of Formula III are advantageously employed in dental compositions in the same manner and for the same purpose as those of Formula I. Exemplary dental compositions are:

*Example 10*

A mouth wash having the following composition is prepared:

Ingredient: Percent by weight
Ethyl alcohol _____ 64.28
Glycerol _____ 12.00
Flavoring agent _____ 6.00
N:N-dilauryl-morpholinium fluoride _____ 17.72

Prior to use this composition is diluted, e.g. by adding 2 ml. of the concentrate to 50 ml. of water, to obtain a fluorine concentration of 0.03% by weight.

The quaternary ammonium fluoride is dissolved in ethyl alcohol. Glycerol and the flavoring ingredient are added to this solution.

*Example 11*

A tooth powder may be prepared as follows:

Ingredient: Percent by weight
Zinc pyrophosphate _____ 96.77
Flavoring agent _____ 1.0
N - myristyl - N-ethyl-morpholinium fluoride (corresponding to 0.1% F) _____ 1.73
Citric acid _____ 0.5

Zinc pyrophosphate and citric acid are well mixed with the active ingredient in a suitable mixer. The mixture is finely ground. Finally the flavoring is stirred in.

A fourth group of compounds (according to the present invention), which reduce the solubility of dental enamel in acids, encompasses those of Formula IV wherein R, R₃ and R₄ are as initially presented immediately following Formula IV. Exemplary quaternary ammonium fluorides are those of Formula IV wherein R, R₃ and R₄ are as enumerated in Table 3.

TABLE 3

| Compound | R | R₃ | R₄ |
|---|---|---|---|
| 1 | Octyl | Methyl | Octyl |
| 2 | Nonyl | Ethyl | Heptyl |
| 3 | Decyl | Propyl | Hexyl |
| 4 | Undecyl | Butyl | Pentyl |
| 5 | Lauryl | Amyl | Butyl |
| 6 | Cetyl | Hexyl | Propyl |
| 7 | Octadecyl | Heptyl | Ethyl |
| 8 | Eicosyl | Octyl | Methyl |

The quaternary ammonium fluorides of Formula IV are prepared in the same manner as is exemplified in Example 12.

*Example 12*

61.44 parts by weight of N:N'-tetramethyl-N:N'-dilauryl-ethylene-diammonium-dibromide are dissolved in 200 parts by weight of absolute ethyl alcohol. To this solution is added 11.62 parts by weight of potassium fluoride.

The mixture is boiled under reflux for 5 hours, allowed to stand for 12 hours and filtered off from the potassium bromide formed. The filtrate is evaporated in vacuo. N:N' - tetramethyl - N:N'-dilauryl-ethylene-diammonium-difluoride remains as residue.

Compounds of Formula IV are advantageously employed in dental compositions in the same manner and for the same purpose as those of Formula I. An exemplary dental composition is:

*Example 13*

A mouth wash having the following composition is prepared:

Ingredient: Percent by weight
Ethyl alcohol _____ 72.2
Glycerol _____ 12.0
Flavoring agent _____ 6.0
N:N' - tetramethyl - N:N'-dilauryl-ethylene-diammonium difluoride _____ 9.8

Prior to use this composition is diluted, e.g. by adding 2 ml. of the concentrate to 50 ml. of water, to obtain a fluorine concentration of 0.03% by weight.

The quaternary ammonium fluoride is dissolved in ethyl alcohol. Glycerol and the flavoring ingredient are added to this solution.

Another group of compounds according to this invention includes derivatives of amino acids comprising a quaternary ammonium group and being represented by Formula V wherein R represents alkyl from 8 to 20 carbon atoms and preferably from 12 to 18 carbon atoms, e.g. octyl, dodecyl, octadecyl and eicosyl; alkenyl from 8 to 20 carbon atoms and preferably from 12 to 18 carbon atoms, e.g. octenyl, hexadecenyl and eicosenyl; alkylol having from 8 to 20, and preferably from 12 to 18, carbon atoms, e.g. hydroxyoctyl, hydroxytetradecyl and hydroxyeicosyl; alkoxyalkyl having a total of at most twenty carbon atoms, including (lower alkoxy)-(lower alkyl), e.g. methoxymethyl, ethoxyoctyl, propoxyheptadecyl, hexadecyloxybutyl, dodecyloxyamyl, decyloxynonyl and octyloxymethyl; carbocyclic ar-(lower)-alkyl, e.g. 4-phenylbenzyl, phenylethyl and α-naphthyl-3-propyl; lower cycloalkyl, e.g. cyclopropyl, cyclohexyl and cyclooctyl; or heterocyclic, e.g. furfuryl, morpholino, thiomorpholino, picolino, piperidino, pyrrolidino, quinolino and indolino.

$R_3$ represents one of the R radicals or lower alkyl, e.g. methyl, amyl and octyl.

$R_4$ represents one of the $R_3$ radicals.

$R_6$ represents lower alkylene, e.g. methylene, ethylene, isopropylene, octylene; or carbocyclic arylene(lower)alkylene, e.g. 2-phenylene-ethyl, paradiphenylene-propyl and 1-naphthylene-4-methyl.

$R_7$ represents hydrogen; lower alkyl, e.g. methyl, isopropyl, pentyl and octyl; lower alkenyl, e.g. vinyl, allyl, butadienyl-1,3, octenyl-1; lower alkylol, e.g. methylol, β-hydroxypropyl, ω-hydroxyoctyl, carbocyclic (at most bicyclic) aryl, e.g. phenyl, diphenyl and naphthyl; carbocyclic (at most bicyclic) ar(lower alkyl), e.g. 4-phenylbenzyl, phenethyl and β-naphthyl-3-propyl; lower cycloalkyl, e.g. cyclopropyl, cyclohexyl and cyclooctyl; or heterocyclic, e.g. furfuryl, morpholino, thiomorpholino, picolino, piperidino, pyrrolidino, quinolino and indolino.

$R_8$ represents one of the meanings of $R_7$.

Exemplary quaternary ammonium fluorides of Formula V are those wherein R, $R_3$, $R_4$, $R_6$, $R_7$ and $R_8$ are as enumerated in Table 4.

TABLE 4

| Compound | 1 | 2 | 3 | 4 |
|---|---|---|---|---|
| R | Octyl | Dodecyl | Cetyl | Octadecyl. |
| $R_3$ | Methyl | 4-phenylbenzyl | α-Hydroxyoctyl | Furfuryl. |
| $R_4$ | Octyl | Piperidino | Cyclopropyl | Arachidonyl. |
| $R_6$ | Methylene | 2-phenyleneethyl | Heptylene | Ethylene. |
| $R_7$ | Isobutyl | Vinyl | Diphenyl | Furfuryl. |
| $R_8$ | Hydrogen | Isopropyl | Indolino | Cyclooctyl. |

| Compound | 5 | 6 | 7 | 8 |
|---|---|---|---|---|
| R | Eicosyl | 3,7-dimethyl-2,6-octadienyl | 1-dodecenyl | 9,12,15-octadecatrienyl. |
| $R_3$ | Methoxymethyl | Ethyl | Dodecyloxyamyl | Decyloxynonyl. |
| $R_4$ | Picolino | Heptyl | Furfuryl | Dodecyl. |
| $R_6$ | Octylene | Hexylene | Propylene | 1-naphthylene-4-methyl. |
| $R_7$ | Methyl | Allyl | Naphthyl | Morpholino. |
| $R_8$ | Phenyl | Octyl | Quinolino | Cyclohexyl. |

| Compound | 9 | 10 | 11 | 12 |
|---|---|---|---|---|
| R | Arachidonyl | α-Hydroxyoctyl | 9-hydroxytetradecyl | ω-Hydroxyeicosyl. |
| $R_3$ | Morpholino | Propyl | Pyridino | Octyloxymethyl. |
| $R_4$ | Octyloxymethyl | Hexyl | Cetyl | Morpholino. |
| $R_6$ | Pentylene | Isopropylene | Octylene | Methylene. |
| $R_7$ | Ethyl | Butadienyl-1,3 | 4-phenylbenzyl | Thiomorpholino. |
| $R_8$ | ω-Hydroxyoctyl | Heptyl | Pyrrolidino | Cyclopropyl. |

| Compound | 13 | 14 | 15 | 16 |
|---|---|---|---|---|
| R | Methoxymethyl | Ethoxyoctyl | Propoxyheptadecyl | Hexadecyloxybutyl. |
| $R_3$ | Butyl | Picolino | 4-phenylbenzyl | Isopropyl. |
| $R_4$ | Isopropyl | 1-dodecenyl | Phenethyl | Amyl. |
| $R_6$ | Butylene | Paradiphenylene-propyl | Ethylene | Pentylene. |
| $R_7$ | Propyl | Octenyl-1 | Phenethyl | Picolino. |
| $R_8$ | β-Hydroxypropyl | Hexyl | Piperidino | β-Naphthyl-3-propyl. |

| Compound | 17 | 18 | 19 | 20 |
|---|---|---|---|---|
| R | Dodecyloxyamyl | Decyloxynonyl | Octyloxymethyl | 4-phenylbenzyl. |
| $R_3$ | ω-Hydroxyeicosyl | Eicosyl | Piperidino | Pentyl. |
| $R_4$ | Pyridino | Cylooctyl | 9,12,15-octadecatrienyl | Butyl. |
| $R_6$ | Heptylene | Butylene | Hexylene | Propylene. |
| $R_7$ | Butyl | Methylol | β-naphthyl-3-propyl | Piperidino. |
| $R_8$ | Methylol | Amyl | Picolino | Phenethyl. |

| Compound | 21 | 22 | 23 | 24 |
|---|---|---|---|---|
| R | Phenethyl | α-Naphthyl-3-propyl | Cyclopropyl | Cyclohexyl. |
| $R_3$ | Cyclopropyl | 1-dodecenyl | Hexyl | β-Naphthyl-3-propyl. |
| $R_4$ | Ethoxyoctyl | Cyclopropyl | Propyl | Eicosyl. |
| $R_6$ | Ethylene | Heptylene | Methylene | Paradiphenylenepropyl. |
| $R_7$ | Amyl | β-hydroxypropyl | Cyclopropyl | Pyrrolidino. |

| Compound | 25 | 26 | 27 | 28 | 29 |
|---|---|---|---|---|---|
| R | Cyclooctyl | Furfuryl | Morpholino | Thiomorpholino | Pyridine. |
| $R_3$ | Quinolino | Heptyl | Methoxy-methyl | Ethoxyoctyl | Arachidonyl. |
| $R_4$ | Decyloxynonyl | Ethyl | β-Naphthyl-3-propyl | 3,7-dimethyl-2,6-octadienyl | Methoxymethyl. |
| $R_6$ | Hexylene | Octylene | Pentylene | Isobutylene | Butylene. |
| $R_7$ | Hexyl | ω-Hydroxyoctyl | Cyclopropyl | Quinolino | Heptyl. |
| $R_8$ | Butadienyl-1,3 | Propyl | Morpholino | Naphthyl | Ethyl. |

TABLE 4—Continued

| Compound | 30 | 31 | 32 | 33 | 34 |
|---|---|---|---|---|---|
| R | Picolino | Piperidino | Pyrrolidino | Quinolino | Indolino. |
| R₃ | Cetyl | Ethoxyoctyl | Cyclohexyl | Dodecyl | Octyl. |
| R₄ | 9-hydroxytetradecyl | 4-phenylbenzyl | Indolino | Cyclooctyl | Methyl. |
| R₆ | Propylene | Ethylene | 1-naphthylene-4-methyl | Methylene | 2-phenyleneethyl. |
| R₇ | Phenyl | Cyclooctyl | Indolino | Octyl | Hydrogen. |
| R₈ | Allyl | Furfuryl | Diphenyl | Vinyl | Methyl. |

The quaternary ammonium fluorides of Table 4 are prepared in the same manner as set forth in Example 14.

Example 14

50.55 parts by weight of N-[2-(N':N'-dimethylaminocarbonyl)-ethyl]-N-octadecyl-diethyl-ammonium bromide are dissolved in 350 parts by weight of water. An aqueous solution of 12.7 parts by weight of silver fluoride is added thereto and the mixture is heated for 15 minutes at 60° C.

After cooling, the precipitated silver bromide is filtered off and the filtrate is evaporated to dryness in vacuo. N-[2-(N':N'-dimethyl-aminocarbonyl)-ethyl]-N-octadecyl-diethyl-ammonium fluoride remains as residue.

Compounds of Formula V are advantageously employed in dental compositions in the same manner and for the same purpose as those of Formula I. An exemplary dental composition is:

Example 15

A mouth wash having the following composition is prepared—

| Ingredient: | Percent by weight |
|---|---|
| Ethyl alcohol | 67.6 |
| Glycerol | 12.0 |
| Flavoring agent | 6.0 |
| N-[2-(N':N'-dimethylaminocarbonyl)-ethyl]-N-dodecyl-diethyl-ammonium fluoride | 14.4 |

Prior to use this composition is diluted, e.g. by adding 2 ml. of the concentrate to 50 ml. of water, to obtain a fluorine concentration of 0.03% by weight.

The quaternary ammonium fluoride is dissolved in ethyl alcohol. Glycerol and the flavoring are added to this solution.

In addition to the above-described compounds, further compounds analogous to those of Formula III are also contemplated within the scope of the instant invention. These compounds are of the Formulae VI to X:

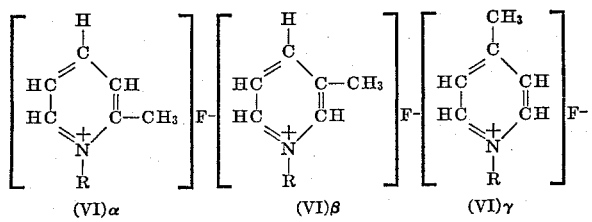

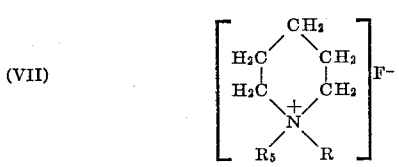

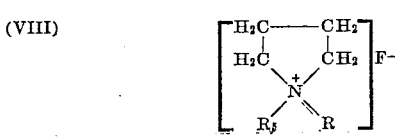

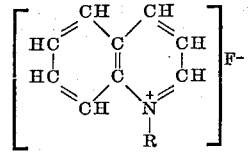

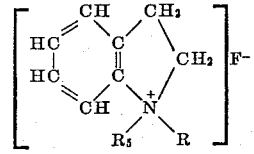

In Formulae VI through X, R and R₅ have the same meanings as indicated in the detailed description of compounds of Formula III and as exemplified in Table 2. Examples of compounds of Formulae VI and IX are those wherein R has each of the meanings enumerated in Table 2. Examples of compounds of Formulae VII, VIII and X are those wherein R and R₅ are, respectively, each of the matching pairs enumerated in Table 2. All of the resulting quaternary ammonium fluorides are advantageously employed in dental compositions in the same manner and for the same purpose as those of Formula I. Compounds of Formulae VI through X are prepared in the same manner as set forth in Example 9.

It is understood that the present invention is in no way limited to the specific examples herein. Various other quaternary ammonium fluorides of this invention can be substituted for those specifically identified in the examples.

What is claimed is:

1. A compound of the formula

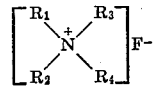

wherein
$R_1$ is a member selected from the group consisting of alkyl, alkenyl, and alkylol, having from 12 to 18 carbon atoms;

$R_2$ is a member selected from the group consisting of alkyl and alkenyl having from 12 to 18 carbon atoms, phenoxy-(lower alkyl), furfuryl, carboxymethyl, phenyl, diphenyl, naphthyl, lower cycloalkyl and (lower cycloalkyloxy)-(lower alkyl);

$R_3$ is a member selected from the group consisting of lower alkyl, lower alkenyl, lower alkylol and lower alkoxy; and $R_4$ is a member selected from the group consisting of lower alkyl, lower alkenyl, lower alkylol, lower alkoxy, naphthyl and phenoxyethyl;

all of the fluorine being bonded to the quaternary ammonium nitrogen.

2. Dodecyl-ethyl-dimethyl-ammonium fluoride.
3. Dilauryl-dimethyl-ammonium fluoride.
4. Octadecyl-methyl-diethanol-ammonium fluoride.
5. Cyclohexyl-cetyl-dimethyl-ammonium fluoride.
6. Δ⁸,⁹-octadecenyl-triethyl-ammonium fluoride.
7. Furfuryl-lauryl-dimethyl-ammonium fluoride.
8. N-(β-hydroxy-dodecyl) - N - trimethyl - ammonium fluoride.
9. Phenoxyethyl-cetyl-dimethyl-ammonium fluoride.

10. N-(β-hydroxy-dodecyl)-N - triethanol - ammonium fluoride.
11. N-(2-ethoxyethyl)-N-dodecyl - dimethyl - ammonium fluoride.
12. N-(ω-hydroxy-dodecyl)-trimethyl-ammonium fluoride.
13. N-phenyl-N-hexadecyl-diethyl-ammonium fluoride.
14. N-cyclohexyl-N - octadecyl - dimethyl - ammonium fluoride.
15. N-carboxymethyl-N-eicosyl-dimethyl - ammonium fluoride.
16. Dodecyl-triethyl-ammonium fluoride.

References Cited by the Examiner

UNITED STATES PATENTS

| | | | |
|---|---|---|---|
| 2,295,504 | 9/1942 | Shelton | 260—247 X |
| 2,692,264 | 10/1954 | Wojcik | 260—247 |
| 2,773,070 | 12/1956 | Lichtenwalter et al. | 260—567.6 |
| 2,826,582 | 3/1958 | Miller | 260—290 |
| 2,979,863 | 4/1961 | Bauwin | 260—247 X |
| 3,124,512 | 3/1964 | Schmid et al. | 167—93 |

OTHER REFERENCES

Gershon et al.: Drug and Cosmetic Industry, vol. 82, No. 2, page 160 (February 1958).

Tseng et al.: Chem. Abst., vol. 31, (1937) col. 655.

ALEX MAZEL, *Primary Examiner.*

NICHOLAS S. RIZZO, *Examiner.*

H. R. JILES, *Assistant Examiner.*